(12) United States Patent
Fung et al.

(10) Patent No.: US 9,951,206 B2
(45) Date of Patent: Apr. 24, 2018

(54) HALOGEN-FREE PLASTIC FLOOR TILE AND MODIFIED POLYESTER COMPOSITION FOR USE IN PRODUCING THE SAME

(71) Applicant: NAN YA PLASTICS CORPORATION, Taipei (TW)

(72) Inventors: Dein-Run Fung, Taipei (TW); Ying-Te Huang, Taipei (TW); Chun-Lai Chen, Taipei (TW); Tzai-Shing Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 304 days.

(21) Appl. No.: 14/957,982

(22) Filed: Dec. 3, 2015

(65) Prior Publication Data

US 2016/0168358 A1 Jun. 16, 2016

(30) Foreign Application Priority Data

Dec. 11, 2014 (TW) .............................. 103143215 A

(51) Int. Cl.
| | |
|---|---|
| C08G 63/02 | (2006.01) |
| C08K 5/524 | (2006.01) |
| C08K 5/12 | (2006.01) |
| B32B 37/14 | (2006.01) |
| B32B 33/00 | (2006.01) |
| C08L 67/02 | (2006.01) |
| E04F 15/10 | (2006.01) |
| C08K 3/38 | (2006.01) |
| B32B 37/18 | (2006.01) |
| B32B 38/06 | (2006.01) |

(52) U.S. Cl.
CPC .............. *C08K 5/524* (2013.01); *B32B 33/00* (2013.01); *B32B 37/14* (2013.01); *C08K 5/12* (2013.01); *C08L 67/02* (2013.01); *E04F 15/105* (2013.01); *B32B 37/182* (2013.01); *B32B 38/06* (2013.01); *B32B 2037/148* (2013.01); *B32B 2307/3065* (2013.01); *B32B 2307/54* (2013.01); *B32B 2307/554* (2013.01); *B32B 2307/558* (2013.01); *B32B 2307/5825* (2013.01); *B32B 2309/105* (2013.01); *B32B 2367/00* (2013.01); *B32B 2419/04* (2013.01); *C08K 2003/387* (2013.01)

(58) Field of Classification Search
CPC .... C08K 5/524; C08K 5/12; C08K 2003/387; B32B 37/14; B32B 2309/105; B32B 33/00; B32B 37/182; B32B 38/06; B32B 2307/3065; B32B 2037/148; B32B 2307/54; B32B 2307/554; B32B 2307/558; B32B 2307/5825; B32B 2367/00; B32B 2419/04; C08L 67/02; E04F 15/105
See application file for complete search history.

(56) References Cited

U.S. PATENT DOCUMENTS 8,071,695 B2 * 12/2011 Strand ..................... C08L 67/02
525/437

* cited by examiner

*Primary Examiner* — Terressa Boykin
*Assistant Examiner* — Vicki Wu
(74) *Attorney, Agent, or Firm* — Bacon & Thomas, PLLC

(57) ABSTRACT

A modified polyester resin composition comprises a combination of a PET polyester, a PCT polyester, a CHDM modified copolyester comprising PCTA, PCTG or PETG, and a modified polymer at least comprising TPU or EPDM, wherein the modified polymer accounts for 3-25 wt % and the rest accounts for 97-75 wt %, based on the total weight of the resin; and the modified polyester resin composition is suited for use in a halogen-free, heavy metal-free, and volatile organic compound-free polyester-based plastic floor tile excellent in higher resistance to wear and tear, better tensile strength, more preferable resistance to both lit cigarette e and solvents, and particularly being friendliness to environment and not hazardous to health.

17 Claims, 2 Drawing Sheets

HALOGEN-FREE PLASTIC FLOOR TILE AND MODIFIED POLYESTER COMPOSITION FOR USE IN PRODUCING THE SAME

BACKGROUND OF THE INVENTION

1. Technical Field

The present invention relates to polyester-based plastic floor tiles, and more particularly, to a halogen-free, heavy metal-free, and volatile organic compound-free polyester-based plastic floor tile excellent in both physical and chemical properties, such as excellent in higher resistance to wear and tear, better tensile strength, more preferable resistance to both lit cigarette e and solvents.

2. Description of Related Art polyvinyl chloride-based (abbreviated as PVC-based) plastic floor tiles contain halogen and heavy metals and are seldom environment-friendly so that PVC-based plastic floor tiles are not recommended for recycling. The toxic dioxin gas produced during the process of incineration of discarded PVC-based plastic floor tiles is hazardous to human beings' health. Hence, the ban on PVC-based plastic floor tiles is increasingly tight.

By contrast, no dioxin is produced during the process of incineration of discarded polyolefin resin floor tiles, such as PE-based plastic floor tiles and PP-based plastic floor tiles. But polyolefin resin floor tiles have disadvantages, including difficult to print, difficult to adhere, and difficult to mount and process. Moreover, polyolefin resin is disadvantageously characterized by high fluidity; as a result, not only are laminated finished products made of polyolefin resin predisposed to uneven thickness, but the material of the polyolefin resin floor tile is also susceptible to deterioration when subjected to UV irradiation.

More detailed speaking, during the process for producing polyolefin resin floor tiles, deformation and printed pattern-related defects as well as having uneven thickness are likely to happen to laminated finished products made of polyolefin resin in the course of heating lamination, and more particularly, the polyolefin resin floor tiles are susceptible to deterioration if subjected to UV irradiation.

Hence, the polyolefin resin floor tiles during their production process must undergo processes, such as modification, electrical corona treatment, and surface treatment, thereby taking time, incurring costs, and causing high energy consumption related to raw materials for use in manufacturing polyolefin resin. Particularly, the produced polyolefin resin floor tile because of poor weatherability has a short service life and also has a negative effect on environmental protection.

With regard to polyethylene terephthalate-based (abbreviated as PET-based) plastic floor tiles made of laminated polyester PET films or sheets, conventional polyester PET resin due to having high crystallization displays high fluidity when heated and melted, resulted in that polyester PET resin is unfit for open-style calendaring machine, but is usually processed with an extruder, to produce a polyester PET film or sheet. For example, U.S. Pat. No. 5,998,005 and U.S. Pat. No. 6,068,910 disclose that, during a speedy production process for producing polyester PET films or sheets, a calendaring machine is likely to get stuck and thus become ineffective in shaping the polyester PET products, and thus the calendaring machine finally sustains a high load to shorten the service life of a transmission shaft for use in the calendaring machine thereof.

Further, due to having high crystallization but low crystallization speed, both PET and polyester if used to produce PET or polyester films or sheets are difficult to shape and process, conversely require a high molding temperature and a long production cycle, and also feature poor impact performance. Although U.S. Pat. No. 7,438,841 discloses a polyester composite suited for use in calendaring machine, the polyester composite manifests low thermal resistance and thus its crystals gradually decompose at high temperature to thereby make the calendaring machine stuck; as a result, its processability is greatly compromised in a manner to eventually reduce both the mechanical strength and the resistance to wear and tear of polyester finished products.

When a film or a sheet completely produced through a calendaring machine should have been processed with multiple steps of extension, including an embossed process, a cooled process and a winded process, leading to the produced film or sheet with high contraction rate and poor size stability. If multiple layers of films or sheets with different contraction rates are hot-pressed and laminated to produce laminated floor tiles, the finished products will be compromised in terms of consistency of appearance and thickness. Accordingly, both PET and polyester have long been regarded by persons skilled in the art as ineligible to be calendered for forming sheet-like materials.

Moreover, conventional PVC-based floor tiles, polyolefin resin-based floor tiles, and polyester PET-based plastic floor tile demonstrate low resistance to lit cigarettes and thus are likely to be defaced when the lit cigarettes are put, or stubbed out, on the aforesaid floor tiles.

SUMMARY OF THE INVENTION

In view of conventional PVC-based plastic floor tiles containing halogen and processing-required heavy metals being seldom environment-friendly and seriously hazardous to human beings' health, the present invention provides a polyester-based plastic floor tile essentially made of a modified polyester resin composition, such as a modified polyethylene terephthalate polyester (PET), to overcome aforesaid drawbacks of the prior art, and the polyester-based plastic floor tile of the present invention has advantages including high transparency, high luster, low fog density, low spontaneous contraction rate when stored, easy to print, and unlikely to detach.

The modified polyester resin composition of the present invention is modified with a copolyester and a modified polymer to make improvement in processability, physical properties, rigidity, thermal resistance, resistance to lit cigarettes, friendliness to environment, and weatherability.

The modified polyester resin composition in the presence of adding appropriate modifiers, lubricants, plasticizers and processing aids is a low-crystallization polyester resin composition due to its low fluidity when heated and melted. The modified polyester resin composition of the present invention is suited for use in open-style calendaring machines to produce a plastic film or sheet by calendaring method or for use in extruders to produce a plastic film or sheet by extrusion method.

The modified polyester resin composition excellent in low-crystallization is suited to undergo a laminated process for lamination to manufacture polyester-based floor tiles of having various specifications, and more particularly, the modified polyester resin composition if processed may reuse those conventional printers and floor tile lamination devices already for use in processing a conventional PVC-based plastic film or sheet.

The polyester-based plastic film or sheet excellent in low-crystallization, if made from the invented modified polyester resin composition of the present invention, may display low fluidity to gain evenness in thickness as well as without deformation of printing patterns in advance printed thereon in the course of thermoforming process for lamination.

The polyester-based plastic floor tile of the present invention is a halogen-free and heavy metal-free polyester-based plastic floor tile which is environment-friendly, displays high resistance to wear and tear, high tensile strength, high resistance to solvents, and high resistance to lit cigarettes, but is not hazardous to health. Accordingly, the invented polyester-based plastic floor tile of the present invention may use to replace the PVC-based plastic floor tile.

DETAILED DESCRIPTION OF THE INVENTION

Figure 1:
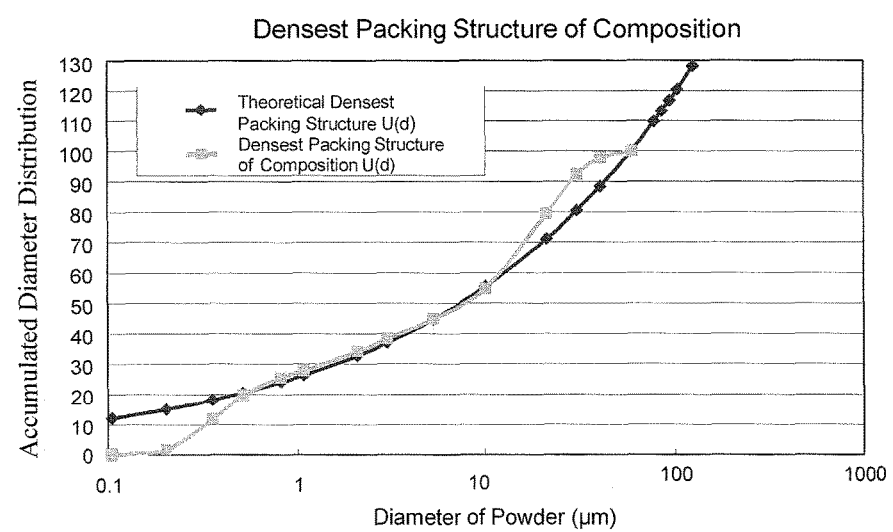
FIG. 1 is a graph showing actual and theoretical densest packing of spherical calcium carbonate particles blended with different particle diameters together.

A polyester-based plastic floor tile of the present invention is disclosed of excellence in higher resistance to wear and tear, better tensile strength and more preferable resistance to lit cigarette resistance than that of conventional PVC-based.

Various solutions provided according to the present invention are described below.

1. Preparation of modified polyester resin composition:

The modified polyester resin composition of the present invention comprises 97-75 wt % of polyester resin and 3-25 wt % of modified polymer, based on the total weight of the polyester resin composition.

The polyester resin is one or more polyesters selected from the group consisting of polyethylene terephthalate (PET), poly(ethylene-co-1,4-cyclohexylenedimethylene terephthalate) (PCT) and 1,4-cyclohexanedimethanol modified copolyester (abbreviated as CHDM modified copolyester).

The CHDM modified copolyester is one or more copolyesters selected from the group consisting of poly chloro terephthalate acetate copolyester (PCTA), poly chloro terephthalate glycol copolyester (PCTG) and polyethylene terephtalate glycol-modified (PETG).

The PETG or the PCTG each is a copolyester of terephthalic acid (TPA), 1,4-cyclohexanedimethanol (CHDM) and ethylene glycol (EG), but differ from each other mainly in diol content, wherein PETG is characterized by EG content larger than 50%, and PCTG is characterized by CHDM content larger than 50%. And, the PCTA is a copolyester of TPA, CHDM and isophthalic acid (IPA).

The different alcoholized copolyesters mention above, such as PCTA. PCTG or PETG, each display satisfactory physical properties regarding chemical resistance and transparency, are intrinsically characterized by a viscosity (IV) of 0.76-0.85 dL/g, a melting point Tm of 135-145° C., and a glass transition temperature Tg of 70-80° C., and thus are fit to be processed with a calendaring machine, a single-screw extruder, a twin-screw extruder, a kneader, a roller mill and so forth 140-190° C.

Hence, after the aforesaid different alcoholized copolyesters have undergone a thermoforming process, they or their finished products can be discarded and recycled by a combustion process without producing any thick black smoke and dioxin gas during the combustion process, thereby causing no harm to the Earth's ecological environment and human beings' health. The CHDM modified copolyesters containing the other PCT, PCTG or PCTA are also suitable to be processed with related apparatuses. The total amount of the polyester resin and modified polymer of the present invention in use equals to 100 PHR (Parts per Hundreds of Resin).

The modified polymer is one or more polymers selected from the group consisting of polybutadiene, thermoplastic polyurethane (TPU), styrene-butadiene copolymer, ethylene-propylene elastomer, polyolefin, polyether-ester type elastomer, terpolymer elastomer made from ethylene propylene diene monomer (abbreviated as EPDM), methyl methacrylate butadiene styrene (MBS), styrene-butadiene-styrene block copolymer (SBS) and styrene-ethylene/butylene-styrene copolymer rubber (SEBS).

2. Improvement of toughness and processing-related fluidity for the polyester resin:

To improve the physical properties of the modified polyester resin composition, it is necessary to add a modified polymer fully compatible with polyester resins to the polyester resin composition of the present invention. There are two purposes of the modified polymer added:

Firstly, the modified polymer adjusts high-temperature processing molten viscosity of polyester-based plastic resins and improves fluidity such that the molten polyester-based plastic does not adhere to the surfaces of the rollers while being calendered and processed with the calendaring machine; and Secondly, the modified polymer improves the polyester resin composition by enhancing the physical toughness and tear strength.

3. Adjustment of binding force kept in between molecules of polyester resin when processed at high temperature:

The polyester resin composition of the present invention includes a processing aid for adjusting the high-temperature processing bonding force between the molecules of the polyester resin. The processing aid requires a usage amount of 0.3-6.0 PHR and comprises a mixture of aromatic carboxylate, propionate, and/or phosphate.

The purpose of including the aromatic carboxylate in the polyester resin composition is to enhance the bonding force between the molecules of the polyester resin so as to form a tightly-bonded material and prevent the severing of molecules in a calendering process performed at high temperature so that it manifests high resistance to wear and tear and high tensile strength and thus is fit for use as a material for making a floor tile.

The aromatic carboxylate includes potassium benzoate, sodium benzoate and/or magnesium benzoate, and requires a usage amount of 0.2-5.0 PHR.

The purpose of using propionate and phosphate as the processing aid is to enhance the thermal resistance of the polyester resin, postpone the time to have a high-temperature cracking process occurred to the polyester resin, and improve the coloring of the film or sheet manufactured from polyester.

The mixture of the propionate and the phosphate requires a usage amount of 0.1-1.0 PHR which is adjustable according to the degree of color change at high temperature and low temperature. The weight ratio of propionate to phosphite equals 0.2-0.4:1, preferably 0.25:1. Preferably, the propionate is pentaerythrite tetra [β-(3,5-di-tert-butyl-4-hydroxyphenyl)-propionate], whereas the phosphite is tri-(2,4-dimethyl-ethyl-ethylbenzene) phosphite.

4. To adjust the amount of a lubricant in use to improve calender bank fluidity, to prevent molten polyester-based plastic from adhering to the surfaces of the rollers, and to preclude gas-induced spots:

The lubricant must be fully compatible with polyester-based plastic resins in order to enable the calendaring machine to produce sheet-shaped materials provided with different degrees of softness, regardless of whether they are transparent or opaque, to maintain the high mechanical strength of the finished products. Moreover, the sheet-shaped materials thus manufactured display improved performance of thermoforming process for lamination because of a special way of blending ingredients such that it is feasible to manufacture laminated plastic floor tiles constituted with different thickness in form of two layered, three layered or multiple layered lamination formed with a hot-pressing laminator.

The lubricant is a $C_{20}$ (or above) fatty acid, fatty acid esters, fatty alcohol, paraffin oil, or a mixture thereof, preferably a $C_{28}$-$C_{32}$ fatty acid or fatty acid ester, with a usage amount of 0.1-5.0 PHR, preferably 0.15-0.35 PHR, to prevent bleeding and fastness of prints.

5. Add a special plasticizer to adjust the softness of the film or sheet substrate:

The polyester resin is so hard that a plasticizer fully compatible with the film or sheet substrate is added thereto to adjust the softness of the substrate and therefore facilitate the subsequent thermoforming process for lamination of the floor tile. According to the present invention, whatever phthalate-containing plasticizers are ruled out to therefore preclude any volatile substance content containing chemicals hazardous to human beings' health will not be released in the circumstances of indoor use.

The polyester-based floor tile of the present invention is made of one or more plasticizers with a typical usage amount of 0.1-50 PHR and selected from the group consisting of phosphate ester-based plasticizer, tribenzoate-based plasticizer, dibenzoate ester-based plasticizer, polyester-based plasticizer and aliphatic acetate ester-based plasticizer, preferably selected from bis-ethyleneglycolate dibenzoate or dipropylene glycol dibenzoate to not only achieve the optimal compatibility but also effectuate the usage amount effectively added up to 30 PHR still keeping no plasticizer separate out.

6. Fillers with different particle diameters are added an appropriate usage amount to enhance the mechanical strength of the polyester-based plastic floor tile:

The filler particles having different particle diameters are selected by Horsfield model and Andrensen equation and mixed to achieve a high processing fluidity composition. The increase in the usage amount of the filler is conducive to the enhancement of the hardness of the bottom-layer of the polyester-based plastic floor tile of the present invention and thus enhances the resistance to wear and tear of the surface-layer and enhances non-flammability.

The filler has a particle diameter of 0.01-100 nm which is selected from talcum powder, calcium carbonate, magnesium hydroxide, aluminum hydroxide, mica powder, limestone and/or silica flour, thereby optimizing the physical properties of the polyester-based plastic composition of the present invention.

Referring to FIG. 1, the densest packing of calcium carbonate particles in a spherical form at a A/B ratio of 7/1 approximates to a theoretical densest packing curve, wherein the theoretical densest packing curve is plotted according to Andrensen equation $U(d)=100(d/d1)^{1/3}$, wherein U(d) denotes the average particle diameter is less than accumulative particle diameter "d" distribution, and "d1" denotes the maximum particle diameter in the system, with calcium carbonate A (average particle diameter $D_{50}=17$ μm), and calcium carbonate B (average particle diameter $D_{50}=3$ μm). According to the present invention, fillers of different particle diameters are selected so as to enhance the usage amount without compromising the physical properties of the polyester-based plastic floor tile of the present invention, wherein the usage amount equals to 0-600 PHR, and the usage amount of each layer of polyester plastic sheet depends on the functional requirements of the floor tile.

To ensure that the surface-layer of a multilayer laminated floor tile has high transparency, no filler is added, wherein the usage amount of the middle-layer and bottom-layer equals 0.1-600 PHR, whereas the usage amount of the monolayer floor tile equals 0.1-600 PHR, so as to ensure high resistance to wear and tear and enhance non-flammability.

7. To improve resistance to lit cigarettes:

The present invention requires 0.02-33 PHR of a modifier grain (or called modifier masterbatch). The modifier integrates three functions, namely coupling, initiation, and non-flammability and thus comprises 0.01-5.0 PHR of a coupling agent, 0.01-3.0 PHR of an initiator, and 0-25 PHR of a flame retardant.

To enhance the synergistic performance of resistance to lit cigarettes and enhance distribution, raw materials with three functions are mixed and ground beforehand to prepare a modifier grain, and then the modifier grain it introduced into the resin.

The purpose of the combined use of the coupling agent and the initiator includes to graft the functional group of the introduced coupling agent to the surface of inorganic powder while the mixing and gelatinization of the polyester resin composition is underway to modify the surface of the inorganic powder; to form a chemical covalent bond graft between the surface-modified inorganic powder and the polyester resin molecular bond under the action of the initiator to enhance the bonding between the inorganic powder inside the polyester resin and the bridge between the molecules of polyester resin, to bring about the high flame retardancy and low smokiness of the polyester resin composition of the present invention, and to enable the polyester resin products to display high resistance to lit cigarettes.

The purpose of the flame retardant is to ensure that the polyester-based plastic floor tile of the present invention will stop burning and manifest low smokiness. The flame retardant is a phosphorus-containing flame retardant, a nitrogen-containing flame retardant, a metallic hydroxide flame retardant, a halogen-free flame retardant, or a combination thereof.

The phosphorus-containing flame retardant is a phosphate ester-containing flame retardant, an ammonium phosphate-containing flame retardant or an aromatic phosphate compound.

The metallic hydroxide flame retardant includes a magnesium hydroxide or an aluminum hydroxide, and the halogen-free flame retardant is a zinc borate. When both aluminum hydroxide and zinc borate are used together as flame retardants such that functions of being served as a filler as well as provided with reduce flammability can be obtained simultaneously, the weight ratio of aluminum hydroxide to zinc borate preferably equals 2:1 through 4:1 to enhance the synergistic effect of low smokiness, and render the flame retardant heavy metal-free.

Figure 2:
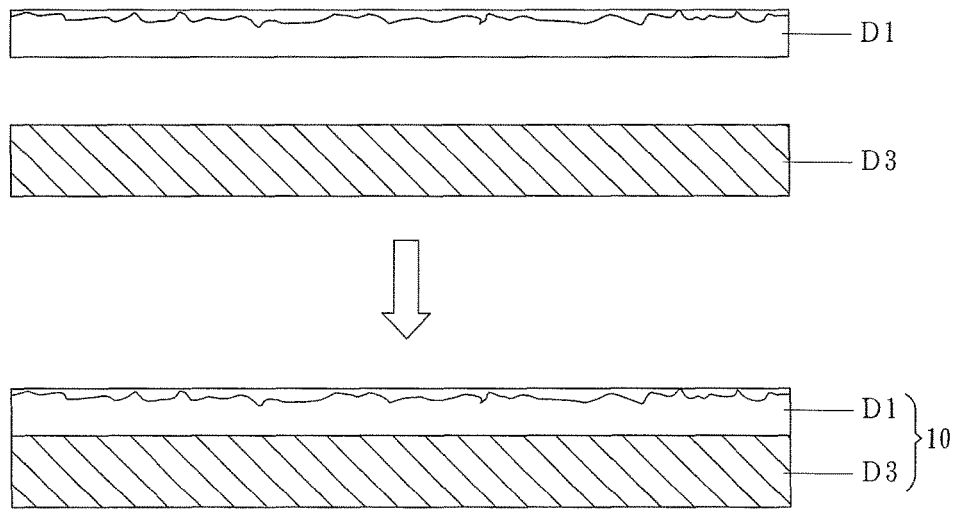
FIG. 2 is a schematic view of a polyester-based plastic floor tile which has a bilayer laminated structure according to the present invention.
Figure 3:
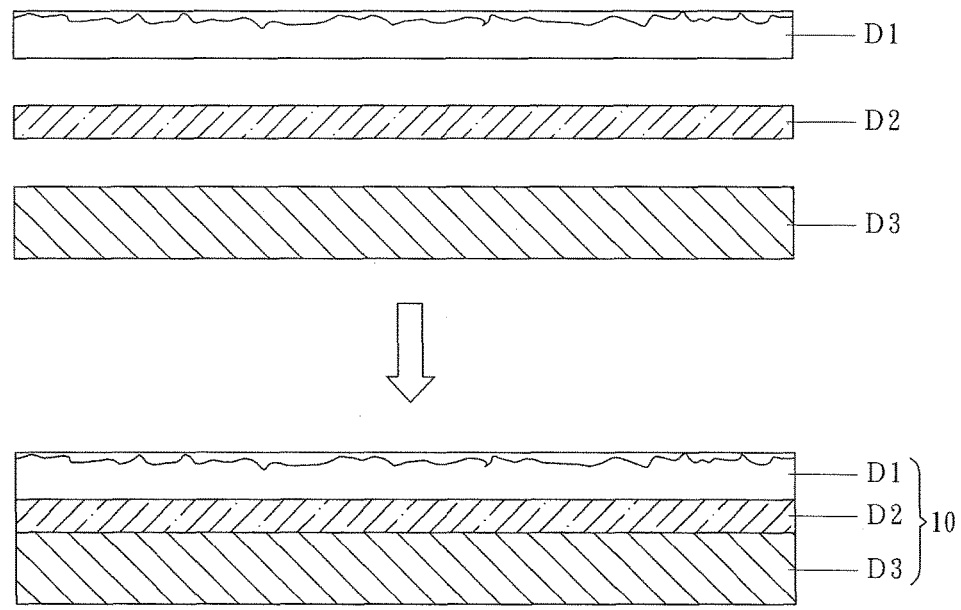
FIG. 3 is a schematic view of a polyester-based plastic floor tile which has a trilayer laminated structure according to the present invention.

Further, referring to FIG. 2 and FIG. 3, a polyester-based plastic floor tile 10 of the present invention has a total thickness of 0.6-5.0 mm and is produced by performing roller-pressing and surface coating treatment on a single layer of polyester plastic sheet or laminating two layers or three layers of polyester plastic sheets, for example, by laminating a piece of surface-layer plastic sheet D1 and a piece of bottom-layer plastic sheet D3 together to form a bilayer polyester-based plastic floor tile, or by laminating three layers of polyester plastic sheets including a piece of surface-layer plastic sheet D1, a piece of middle-layer plastic sheet D2 and a piece of bottom-layer plastic sheet D3 together to form a trilayer polyester-based plastic floor tile, or by laminating multiple layers of polyester plastic sheets together to form a multilayer polyester-based plastic floor tile.

The surface-layer plastic sheet D1 or the middle-layer plastic sheet D2 is 0.08-0.7 mm thick. The bottom-layer plastic sheet D3 is 0.3-3.0 mm thick. Each layer of polyester plastic sheet is made to be colored, colorless or transparent. The thickness of each layer of polyester plastic sheet is adjustable according to the final thickness and number of laminated layers of the polyester-based plastic floor tile.

The modified polyester resin composition for use in producing each layer of polyester plastic sheet of the present invention essentially comprises ingredients as follows:
(a) resin of 100 PHR, including a PET polyester, a PCT polyester, a CHDM modified copolyester and a modified polymer, wherein the modified polymer accounts for 3-25 wt % and the rest accounts for 97-75 wt %, based on the total weight of the resin;
(b) processing aid of 0.3-6 PHR; comprising a mixture of aromatic carboxylate, propionate and phosphate, preferably a solution of the mixture of 0.2-5 PHR aromatic carboxylate and 0.1-1 PHR propionate and phosphite;
(c) lubricant of 0.1-5 PHR;
(d) plasticizer of 0.1-50 PHR;
(e) filler of 0-600 PHR; preferably of 0.1-500 PHR; and
(f) modifier grain of 0.02-33 PHR.

In addition to the aforesaid ingredients, dye of 0-10 PHR can be included in the polyester resin composition as needed.

The process for producing the polyester-based plastic floor tile of the present invention comprises the steps as follows:
(1) through a mixer device uniformly mixing those ingredients required for producing a modified polyester resin composition into a mixture to be prepared for making each layered polyester plastic sheet, after completion of mixing, then introducing the mixture into a Banbury mixer, a kneader, a single-screw extruder or a twin-screw extruder for refinement; wherein the required ingredients contain resin, processing aid, lubricant, polyester-based plasticizer, filler and modifier grain, or further optionally contain dye;
(2) after driving the mixture obtained in step (1) in a roller machine for well-gelatinization, processing the fully well-gelatinized mixture with an extruder or a calendaring machine to produce either a molten surface-layer plastic sheet D1 or a molten middle-layer plastic sheet D2 which is 0.08-0.7 mm thick, a molten bottom-layer plastic sheet D3 which is 0.3-3.0 mm thick, or a monolayer floor tile which is 0.3-3.0 mm thick;
(3) introducing the surface-layer plastic sheet D1, the middle-layer plastic sheet D2, the bottom-layer plastic sheet D3 or the monolayer floor tile into a set of cooling wheels (or called a cooling gear train) for cooling and shaping those plastic sheets, and then the produced each layer of the polyester plastic sheet after completion of cooling and shaping is winded with a winding device for storage; or, in case of the process for producing the monolayer floor tile of the invention, the produced polyester plastic sheet is cut into different sizes and then formed as a finished product of the monolayer floor tile; and
(4) in case of the process for producing the bilayer, trilayer or multilayer polyester-based plastic floor tile of the invention, stacking the surface-layer plastic sheet D1 and/or the middle-layer plastic sheet D2 together with the bottom-layer plastic sheet D3 to form a bilayer, trilayer or multilayer laminated preform structure, and then processing the bilayer, trilayer or multilayer laminated preform structure with a hot press molding machine or a lamination apparatus respectively to form a laminated polyester-based plastic floor tile of a total thickness of 0.6-5.0 mm.

For example, for producing a trilayer polyester-based plastic floor tile, the manufacturing process includes the steps of preparing the surface-layer plastic sheet D1 and the middle-layer plastic sheet D2, stacking them on the bottom-layer plastic sheet D3 produced with the extruder to form a trilayer laminated preform structure, and eventually hot-pressing and laminating the trilayer laminated preform structure with a hot-rolling-shaping device or a lamination apparatus to produce the trilayer polyester-based plastic floor tile.

In order to uniformly disperse all raw materials required for producing the polyester resin composition of the present invention, a modifier grain (or called modifier masterbatch) is necessarily in advance produced through mixing, grinding or gelatinizing the powder raw materials, flame retardant, coupling agent and initiator. After the modifier grains are completely obtained, the modifier grains are allowed to mix and gelatinize with polyester resins and other processing aids both required for preparation of the polyester resin composition of the present invention for use in producing each layer of the polyester plastic sheet. Hence, any polyester resin products if manufactured from the polyester resin composition of the present invention shall display satisfactory mechanical properties thereof.

In step (1) disclosed on the process for producing the polyester-based plastic floor tile of the present invention mentioned above, the surface-layer plastic sheet D1, the middle-layer plastic sheet D2 or the bottom-layer plastic sheet D3 is produced with low-crystallization of polyester or polyester-based plastic resins of which processing property is so approximate to polyvinyl chloride (PVC), resulted in that the surface-layer plastic sheet D1, the middle-layer plastic sheet D2 or the bottom-layer plastic sheet D3 manifest such features as easy to process, easy to laminate, and easy to print.

Regarding the modified polyester resin composition prepared in step (1) mentioned above, the polyester-based plasticizer requires a usage amount of 0.1-50 PHR and is a phosphate ester-based plasticizer, tribenzoate-based plasticizer, dibenzoate ester-based plasticizer, polyester-based plasticizer, and/or aliphatic acetate ester-based plasticizer, preferably bis-ethyleneglycolate dibenzoate or dipropylene glycol dibenzoate (abbreviated as DPGDB), to not only achieve the optimal compatibility but also effectuate the usage amount of 30 PHR still keeping no plasticizer separate out.

Regarding the modified polyester resin composition prepared in step (1) mentioned above, the filler is added to enhance the mechanical strength, resistance to wear and tear and non-flammability for the produced polyester-based plastic floor tile of the present invention. The filler is talcum powder, calcium carbonate, mica powder, limestone, silica flour, and/or metallic hydroxide, such as magnesium hydroxide or aluminum hydroxide, with an average particle diameter of 0.01-100 μm, wherein the filler particles of different particle diameters are selected by Horsfield model, mixed, and processed to achieve a high-fluidity composition, increase the usage amount of the filler, and optimize the physical and chemical properties of the polyester-based plastic composition.

Regarding the modified polyester resin composition prepared in step (1) mentioned above, the filler is characterized in that its optimal filling rate is calculated according to Horsfield model for determining the optimal usage amount required to achieve the densest packing, and it is tested by blending fillers of different particle diameters before constructing the densest packing model and plotting the actual densest packing curves of the fillers according to the powder engineering-oriented Horsfield ideal filling mathematical model. Referring to FIG. 1, the most appropriate particle diameters can be determined with the curves, whereas fillers of the particle diameters together provide the optimal filling rate to thereby display the optimal processing fluidity.

The above-mentioned modifier grain is at least produced by mixing and grinding or gelatinizing a flame retardant, an initiator and a coupling agent in advance. The initiator cooperates with the coupling agent to improve the binding of the inorganic powders and the flame retardants inside the PET-based resin composition thereof. All raw materials required for producing the polyester-based plastic floor tile of the present invention, including the PET-based resin, the inorganic powder and the flame retardant, are therefore tightly bonded together with the added initiator so that both mechanical and physical properties of the produced polyester-based plastic floor tile may be enhanced and improved in respect of such as resistance to wear and tear, tensile strength and resistance to lit cigarettes.

Regarding the modified polyester resin composition prepared in step (1) mentioned above, the inorganic powder filler may be optionally modified with a coupling agent for surface treatment.

The above-mentioned coupling agent is a silane coupling agent or a titanate coupling agent, by either used solely or in combination.

The silane coupling agent is one or more selected from the group consisting of dimethoxysilane, trimethoxysilane, triethoxysilane, phenyltrimethoxysilane, vinyltrimethoxysilane, vinyltriethoxysilane and dimethyldimethoxysilane, by either used solely or in combination.

The titanate coupling agent is an isopropyl titanate, a tetra-isopropyl titanate or a tetraoctyl titanate, by either used solely or in combination.

The initiator may include a peroxide initiator, an azo-compound initiator or a redox-system initiator, either used solely or in combination.

The peroxide initiator is selected from the group consisting of dibenzoyl peroxide (BPO), bis(2,4-dichlorobenzoyl) peroxide (DCBP), tert-butyl peroxypivalate (BPP), dicyclohexyl peroxydicarbonate (DCPD), potassium persulfate (KSP) and ammonium persulfate (ASP), either used solely or in combination.

The azo-compound initiator is selected from a 2,2'-azo-bis-isobutyronitrile (AIBN) or an azobisisoheptonitrile (ABVN), either used solely or in combination.

An oxidant for the redox-system initiator comprises a hydroperoxide, a hydrogen peroxide, a persulfate, a dioyl peroxide or a dialkyl peroxide. A reducing agent of the redox system initiator is an oxalic acid, a glucose, a tertiary amine, a naphthenate, a thiol or an organic metallic compound, by either used solely or in combination.

Based on researches and experiments, the produced polyester-based plastic floor tile of the present invention, if used silane coupling agent cooperated with the redox-system initiator to improve both mechanical and physical properties, can optimally display high resistance to lit cigarettes; in particular, after a lit cigarette is put flatly on the produced polyester-based plastic floor tile of the present invention, the surface of the floor tile is blemished to the least extent.

Regarding the modified polyester resin composition prepared in step (1) mentioned above, the lubricant is used to improve calender bank fluidity, prevent molten polyester-based plastic from adhering to the surfaces of the rollers or wheels of a working machine, and preclude gas-induced spots.

The lubricant is a $C_{20}$ (or above) fatty acid, fatty acid esters, fatty alcohol, paraffin oil, or a mixture thereof, preferably $C_{28}$-$C_{32}$ fatty acid or fatty acid esters, with a typical usage amount of 0.1-5.0 PHR, and preferably 0.15-0.35 PHR, to prevent bleeding and excel in fastness of prints.

Regarding the modified polyester resin composition prepared in step (1) mentioned above, the processing aid is used to enhance resistance to wear and tear, tensile strength and thermal resistance.

The processing aid is an aromatic carboxylate or further mixed with a mixture of propionate and phosphate. The aromatic carboxylate includes potassium benzoate, sodium benzoate, and/or magnesium benzoate. In the case of a mixture of mixed the propionate with the phosphate, the weight ratio of propionate to phosphite equals 0.2-0.4:1, preferably 0.25:1.

Regarding the modified polyester resin composition prepared in step (1) mentioned above, the dye is optional and decided to be added to meet the color phase requirement of products. The dye is an organic dye or an inorganic dye, by either used solely or in combination.

Each layer of the polyester plastic sheet may be colored, colorless or transparent. The degree of transparency of the polyester plastic sheet is adjustable to meet the need for lamination by adjusting the usage amount of the filler.

The surface of the polyester-based plastic floor tile of the present invention or the surface of the surface-layer plastic sheet D1 of the present invention is a smooth surface, a coarse surface, an embossed surface or a decorated surface. So-called decorated surface is meant the upmost surface of the polyester-based plastic floor tile or the surface-layer plastic sheet D1 is formed as a flowable texture surface brought about heating and processing a plastic material.

The surface-layer plastic sheet D1 or the middle-layer plastic sheet D2 of the polyester-based plastic floor tile of the present invention is made to be colored or transparent. Further, the surface of the middle-layer plastic sheet D2 may be a printed pattern surface, a solid-shade surface or a transparent surface.

Regarding the polyester-based plastic floor tile of the present invention, a halogen-free flame retardant may be added to the modified polyester resin composition prepared in step (1) mentioned above to enhance the flame retardancy and spontaneous extinction of the produced non-flammable polyester-based plastic sheet. So that a non-flammable polyester-based plastic floor tile if made from the produced non-flammable polyester-based plastic sheets displays excellent in low-smokiness and flame retardancy.

When the non-flammable polyester-based plastic floor tile of the present invention comes into contact with a fire or ignition source, the flame retardant contained in the non-flammable polyester-based plastic floor tile not only slows down the burning of the non-flammable polyester-based plastic floor tile, but also causes the burning non-flammable polyester-based plastic floor tile to give off a pale white smoke only. Particularly, spontaneous extinction of the non-flammable polyester-based plastic floor tile occurs as soon as the fire source moves away from the non-flammable polyester-based plastic floor tile.

Hence, the non-flammable polyester-based plastic floor tile of the present invention is safer than both conventional flammable wooden floor tiles and conventional PVC-based floor tiles. Upon contact with fire or ignition sources, the conventional PVC-based floor tiles inevitably give off a much denser black smoke to hinder a safe escape. Therefore, the non-flammable polyester-based plastic floor tile of the present invention may obtain a wonderful balance between environmental protection and user safety.

The polyester-based plastic floor tile of the present invention may be produced as a monolayer, bilayer, trilayer or multilayer polyester-based plastic floor tile, and the upmost surface of the polyester-based plastic floor tile of the present invention is either embossed or not embossed surface as needed. Alternatively, each layer of the polyester plastic sheet may be selectively made of different polyester and then laminated to form the polyester-based plastic floor tile of the present invention.

The polyester-based plastic floor tile of the present invention is less likely to be swelled and eroded by a solvent than that of the PVC-based plastic floor tile. Generally speaking, the polyester-based plastic floor tile of the present invention surpasses commercially-available conventional PVC-based plastic floor tiles in physical properties, such as excellent in both resistance to wear and tear and tensile strength, and especially excellent in weight loss reduced between 10% and 40% with regard to resistance to wear and tear.

The polyester-based plastic floor tile of the present invention approximates to PVC-based plastic floor tiles in processability and surpasses PVC-based plastic floor tiles in physical properties; hence, the polyester-based plastic floor tile of the present invention can substitute for PVC-based plastic floor tiles.

In conclusion, since both conventional process and equipment for producing polyvinyl chloride-based (PVC-based) floor tiles can be directly used to produce the polyester-based plastic floor tile of the present invention, the process for producing polyester-based plastic floor tile of the present invention has effective advantages in much simpler processing procedures, much lower equipment costs, and much faster production speed.

The present invention is further illustrated hereunder with examples and comparative examples, though the scope of the present invention is not restricted to the examples.

EMBODIMENTS AND COMPARATIVE EMBODIMENTS

A modified polyester resin composition prepared from the following ingredients (a)-(j) is applied for use in those examples described hereunder to produce each layered plastic sheet needed to be laminated as a bilayer polyester-based plastic floor tile or as a trilayer polyester-based plastic floor tile:

(a) a resin of 100 PHR, comprises a polyester resin of 97-75 wt % and a modified polymer of 3-25 wt %, by weight of the resin;
  wherein the modified polymer is a TPU or an EPDM or a combination of a TPU and an EPDM, and the polyester resin is a combination of a PET polyester and a CHDM modified copolyester, or alternatively of a PCT polyester and a CHDM modified copolyester;
  and wherein the CHDM modified copolyester is a PETG or a combination of a PCTA, a PETG and a PCTG, and the PETG has an intrinsic viscosity (IV) of 0.76 dL/g, a melting point (Tm) of 140° C., and a glass transition temperature (Tg) of 75° C.;

(b) a processing aid of 0.3-6.0 PHR, wherein the processing aid is a combination of an aromatic carboxylate, a propionate and a phosphite;
  Wherein the aromatic carboxylate is selected from a sodium benzoate or a magnesium benzoate; and wherein the propionate is selected from pentaerythrite tetra [β-(3,5-di-tert-butyl-4-hydroxyphenyl)-propionate], and the phosphite is selected from tri-(2,4-dimethyl-ethylbenzene) phosphite;

(c) a lubricant of 0.1-5 PHR; wherein the lubricant is selected from $C_{28}$-$C_{32}$ fatty acid esters;

(d) a plasticizer of 0.1-50 PHR, which is selected from a dipropylene glycol dibenzoate (DPGDB);

(e) a filler of 0-600 PHR, if used, for use in enhancing processing fluidity and physical properties, which is selected from a combination of calcium carbonates and an aluminum hydroxide;
  Wherein the calcium carbonates contain different size of particles having average particle diameters including 3 μm, 17 μm, 18 μm or 80 μm respectively, and the aluminum hydroxide is a particles having an average particle diameter of 1 μm;

(f) a modifier grain, comprising a coupling agent of 0.01-5.0 PHR, an initiator of 0.01-3.0 PHR, and a flame retardant of 0-25 PHR;
  wherein the coupling agent is selected from phenyltrimethoxysilane or isopropyl titanate; the initiator is selected from dibenzoyl peroxide (BPO), dialkyl peroxide or naphthenate; and the flame retardant is selected from zinc borate; and (i) a dye of 0-10 PHR, which is optionally added.

At examples described hereunder, the bilayer polyester-based plastic floor tile is produced by laminating a surface-layer plastic sheet and a bottom-layer plastic sheet; and the trilayer polyester-based plastic floor tile is produced by in sequence laminating a surface-layer plastic sheet, middle-layer plastic sheet and a bottom-layer plastic sheet together. And, only minor adjustment of manufacturing process as required, the process for producing either the middle-layer plastic sheet or the bottom-layer plastic sheet is approximately to the same process as described for producing the surface-layer plastic sheet at relevant examples.

Preferred examples are shown hereunder to describe the properties of the polyester-based plastic floor tile produced according to the production method of the present invention. In addition, the determination of each property of the polyester-based plastic floor tile or the PVC plastic floor tile is following the test methods as described below.

1. Test of Resistance to Wear and Tear:
  By ASTM-F510 test standard, wherein weight loss is measured by $C_{17}$ grinding wheel.

2. Test of Tensile Strength:
   By ASTM-D412 test standard
3. Test of Resistance to Solvents:
   Test procedure is as follows: impregnate a cotton swab with the solvent described below, and then wipe to and fro across the floor tile with the cotton swab 20 times. The solvent is toluene or adhesive cleaner. The adhesive cleaner contains a mixture of pentane, n-heptane, and n-hexane.
   Test result are ranked into four levels including "excellent", "good", "poor" and "very poor", each level is defined as follows:
   a. Ranking of "excellent" indicates that the surface of the floor tile is neither swelled nor eroded by the tested solvent, resulted in that the surface still keeps bright.
   b. Ranking of "good" indicates that the surface of the floor tile is not swelled but slightly eroded by the tested solvent, resulted in that the surface is likely to turn slightly bright.
   c. Ranking of "poor" indicates that the surface of the floor tile due to mildly being swelled and eroded by the tested solvent become somewhat roughen, resulted in that the surface is likely to turn poorly bright.
   d. Ranking of "very poor" indicates that the surface of the floor tile due to seriously being swelled and eroded by the tested solvent become so lumped, resulted in that the surface is dull.
4. Test of Resistance to Both Lit Cigarettes A and Lit Cigarettes B:
   4a. Test of Resistance to Lit Cigarettes A is Measured as Follows:
   Put the lit cigarette flatly on the floor tile for 3 minutes and then see whether the surface of the floor tile is blemished;
   4b. Test of Resistance to Lit Cigarettes B is t Measured as Follows:
   Stub out a lit cigarette vertically on the floor tile and then see whether the surface of the floor tile is blemished;
   Each test result is ranked into five levels including "level 1", "level 2", "level 3", "level 4" and "level 5", each level is defined as follows:
   a. Ranking of "level 1" indicates that no perceivable blemish leaves behind on the surface of the floor tile, and represents the tested floor tile is excellent in Resistance to Lit Cigarettes A (or Resistance to Lit Cigarettes B).
   b. Ranking of "level 2" indicates that a mildly perceivable blemish leaves behind on the surface of the floor tile, and represents the tested floor tile is good in Resistance to Lit Cigarettes A (or Resistance to Lit Cigarettes B).
   c. Ranking of "level 3" indicates that a yellowish charred blemish perceivably leaves behind on the surface of the floor tile, and represents the tested floor tile is fair in Resistance to Lit Cigarettes A (or Resistance to Lit Cigarettes B).
   d. Ranking of "level 4" indicates that a brownish charred blemish clearly leaves behind on the surface of the floor tile, and represents the tested floor tile is poor in Resistance to Lit Cigarettes A (or Resistance to Lit Cigarettes B).
   e. Ranking of "level 5" indicates that a dented blemish is charred on the surface of the floor tile, and represents the tested floor tile is very poor in Resistance to Lit Cigarettes A (or Resistance to Lit Cigarettes B).
5. Test of Processing Fluidity:
   Test procedure is as follows: the test rollers is maintained at temperature of 140-190° C. for 5 minutes, and a roller-to-roller gap is kept of 5 mm wide, and then observe whether the surfaces of the rollers is adhered on plastic materials after the molten polyester or PVC plastic is processed through the tested rollers.

Test result are ranked into four levels including "excellent", "good", "fair" and "poor", each level is defined as follows:
   a. Ranking of "excellent" indicates that tested plastic material is unlikely to adhere on the surfaces of the rollers, and represents the tested plastic material has excellent property of processing fluidity.
   b. Ranking of "good" indicates that tested plastic material is mildly adhered on the surfaces of the rollers, and represents the tested plastic material has good property of processing fluidity.
   c. Ranking of "fair" indicates that tested plastic material is likely to adhere on the surfaces of the rollers, and represents the tested plastic material has no good property of processing fluidity.
   d. Ranking of "poor" indicates that tested plastic material is often seriously adhered on the surfaces of the rollers, and represents the tested plastic material has poor property of processing fluidity.

Example 1

Through thermoforming process for lamination, a trilayer polyester-based plastic floor tile of 2.0 mm (in thickness) is produced from thermoforming and laminating a surface-layer plastic sheet D1 of 0.3 mm, a middle-layer plastic sheet D2 of 0.08 mm, and a bottom-layer plastic sheet D3 of 1.7 mm, respectively.

The surface-layer plastic sheet D1, the middle-layer plastic sheet D2 and the bottom-layer plastic sheet D3 are made of the required polyester resin compositions prepared by specific formulations shown in Table 1, respectively.

The process for producing the surface-layer plastic sheet D1 having thickness of 0.3 mm is as follows
1) A modifier grain comprising an isopropyl titanate of 0.1 PHR and a dibenzoyl peroxide (BPO) of 0.1 PHR is prepared in advance according to specific compositions enumerated in Table 1.
2) Afterward, specific raw materials shown in Table 1 including a PCTG of 75.0 PHR, a TPU of 25 PHR, a sodium benzoate of 0.5 PHR, a propionate of 0.1 PHR, a phosphite of 0.4 PHR, a fatty acid esters ($C_{28}$ to $C_{32}$) of 0.25 PHR, a DPGDB of 5.0 PHR and the predetermined modifier grain of 0.2 PHR are mixed with a mixer and then the mixture is introduced into a Banbury mixer to be mixed therein evenly at 145±10° C.
3) After being gelatinized with a roller machine, the mixture mixed fully and evenly is processed in a calendering process to produce a molten plastic sheet which is of 0.3 mm in thickness, and an embossed process is further proceeded to have the plastic sheet formed as a patterned surface, and subsequently the embossed plastic sheet is driven to subject to preliminary cooling, curing, and molding.
4) The plastic sheet of step 3) is further introduced into a cooling gear train to be sufficiently cooled and shaped, and then the surface-layer plastic sheet D1 of 0.3 mm in thickness is produced.

The middle-layer plastic sheet D2 of 0.08 mm and the bottom-layer plastic sheet D3 of 1.7 mm are respectively produced by same or similar manufacturing process for produce the surface-layer plastic sheet mentioned above.

After being manufactured, the surface-layer plastic sheet DE middle-layer plastic sheet D2 and bottom-layer plastic sheet D3 are stacked together and further processed with a hot-rolling-shaping device or a lamination apparatus to obtain a trilayer polyester-based plastic floor tile of 2 mm.

To test the physical properties of the produced polyester-based plastic floor tile, the test result is shown in Table 2.

Example 2

A trilayer polyester-based plastic floor tile of 3.0 mm (in thickness) is produced by the same manner as in Example 1.

A surface-layer plastic sheet D1 of 0.7 mm, a middle-layer plastic sheet D2 of 0.08 mm, and a bottom-layer plastic sheet D3 of 2.3 mm are made of the required polyester resin compositions prepared by specific formulations shown in Table 1, respectively.

And, the trilayer polyester-based plastic floor tile of 3.0 mm (in thickness) is produced by laminating from the surface-layer plastic sheet DE the middle-layer plastic sheet D2 and the bottom-layer plastic sheet D3.

To test the physical properties of the produced polyester-based plastic floor tile, the test result is shown in Table 2.

Example 3

A monolayer polyester-based plastic floor tile of 3.0 mm is disclosed. The required polyester resin composition is prepared by specific formulations shown in Table 1 and mixed uniformly with a mixer, and then the mixture is introduced into a kneader for refinement at 145±10° C.

After being gelatinized with a first set of rollers of a calendaring machine, a molten plastic sheet of 3.08 mm is produced through a second set of rollers of the calenlaring machine. Subsequently, the molten plastic sheet is processed through an embossed process, and then the embossed plastic sheet is finally driven to subject to cooling, curing and forming to obtain the monolayer polyester-based plastic floor tile of 3.0 mm.

To test the physical properties of the produced monolayer polyester-based plastic floor, the test result is shown in Table 2.

Example 4

A bilayer polyester-based plastic floor tile of 2.0 mm (in thickness) is produced by the same manner as in Example 1.

A surface-layer plastic sheet D1 of 0.3 mm and a bottom-layer plastic sheet D3 of 1.7 mm are made of the required polyester resin compositions prepared by specific formulations shown in Table 3, respectively.

And, the bilayer polyester-based plastic floor tile of 3.0 mm is produced by laminating from the surface-layer plastic sheet D1 and the bottom-layer plastic sheet D3.

To test the physical properties of the produced polyester-based plastic floor tile, the test result is shown in Table 4.

Example 5

A bilayer polyester-based plastic floor tile of 3.0 mm (in thickness) is produced by the same manner as in Example 1.

A surface-layer plastic sheet D1 of 0.7 mm and a bottom-layer plastic sheet D3 of 2.3 mm are made of the required polyester resin compositions prepared by specific formulations shown in Table 3, respectively.

And, the bilayer polyester-based plastic floor tile of 3.0 mm is produced by laminating from the surface-layer plastic sheet D1 and the bottom-layer plastic sheet D3.

To test the physical properties of the produced polyester-based plastic floor tile, the test result is shown in Table 4.

Comparative Example 1

A trilayer PVC-based plastic floor tile of 3.0 mm (in thickness) is produced by the same manner as in Example 1.

Without using a coupling agent and/or an initiator, a surface-layer plastic sheet D1 of 0.7 mm, a middle-layer plastic sheet D2 of 0.08 mm, and a bottom-layer plastic sheet D3 of 2.3 mm are made of the required polyester resin compositions prepared by specific formulations shown in Table 1, respectively.

And, the trilayer PVC-based plastic floor tile of 3.0 mm is produced by laminating from the surface-layer plastic sheet D1, the middle-layer plastic sheet D2 and the bottom-layer plastic sheet D3.

To test the physical properties of the produced trilayer PVC-based plastic floor tile, the test result is shown in Table 2.

Comparative Example 2

A trilayer PETG-based plastic floor tile of 3.0 mm (in thickness) is produced by the same manner as in Example 1.

Without using a coupling agent and/or an initiator, a surface-layer plastic sheet D1 of 0.7 mm, a middle-layer plastic sheet D2 of 0.08 mm, and a bottom-layer plastic sheet D3 of 2.3 mm are made of the required polyester resin compositions prepared by specific formulations shown in Table 1, respectively.

And, the trilayer PETG-based plastic floor tile of 3.0 mm is produced by laminating from the surface-layer plastic sheet D1, the middle-layer plastic sheet D2 and the bottom-layer plastic sheet D3.

To test the physical properties of the produced trilayer PETG-based plastic floor tile, the test result is shown in Table 2.

Comparative Example 3

A bilayer PVC-based plastic floor tile of 3.0 mm (in thickness) is produced by the same manner as in Example 1.

Without using a coupling agent and/or an initiator, a surface-layer plastic sheet D1 of 0.7 mm and a bottom-layer plastic sheet D3 of 2.3 mm are made of the required polyester resin compositions prepared by specific formulations shown in Table 3, respectively.

And, the bilayer PVC-based plastic floor of 3.0 mm is produced by laminating from the surface-layer plastic sheet D1 and the bottom-layer plastic sheet D3.

To test the physical properties of the produced bilayer PVC-based plastic floor tile, the test result is shown in Table 4.

Comparative Example 4

A bilayer PETG-based plastic floor tile of 3.0 mm (in thickness) is produced by the same manner as in Example 1.

PETG-based plastic is modified with TPU and selects DOP as a plasticizer. A surface-layer plastic sheet D1 of 0.7 mm and a bottom-layer plastic sheet D3 of 2.3 mm are made of the required polyester resin compositions prepared by specific formulations shown in Table 3, respectively.

And, the bilayer PETG-based plastic floor of 3.0 mm is produced by laminating from the surface-layer plastic sheet D1 and the bottom-layer plastic sheet D3.

To test the physical properties of the produced bilayer PETG-based plastic floor tile, the test result is shown in Table 4.

Comparative Example 5

A bilayer PETG-based plastic floor tile of 3.0 mm (in thickness) is produced by the same manner as in Example 1.

PETG-based plastic is modified with TPU and particularly neither a coupling agent nor an initiator is used.

A surface-layer plastic sheet D1 of 0.7 mm and a bottom-layer plastic sheet D3 of 2.3 mm are made of the required polyester resin compositions prepared by specific formulations shown in Table 3, respectively.

And, the bilayer PETG-based plastic floor of 3.0 mm is produced by laminating from the surface-layer plastic sheet D1 and the bottom-layer plastic sheet D3.

To test the physical properties of the produced bilayer PETG-based plastic floor tile, the test result is shown in Table 4.

Results

By comparing the results shown in Table 2 and Table 4, the following conclusion can be obtained:

1. From Example 2 and Example 5, the silane coupling agent in the composition of raw materials operates in conjunction with the redox system initiator to therefore optimize the resistance to lit cigarettes. And, after a lit cigarette is put flatly or vertically on the polyester-based plastic floor tile produced from Example 2 and Example 5, no perceivable blemish leaves behind on the surface of the polyester-based plastic floor tile thereof.

2. Table 2 (or Table 4) shows data pertaining to the polyester-based plastic floor tiles produced in Example 2 (or Example 5) and Comparative Example 2 (or Comparative Example 4), respectively.

In Example 2 or Example 5, a coupling agent and an initiator are included in the polyester resin compositions of the Example 2 or the Example 5 such that the produced polyester-based plastic floor tile thus is ranked of "level 1" regarding so excellent in Resistance to Lit Cigarettes better than that of polyester-based plastic floor tile produced from Comparative Example 2 and ranked of "level 3" from the same test, and even better than that of polyester-based plastic floor tile produced from Comparative Example 4 and ranked of "level 2" from the same test.

3. Each polyester-based plastic floor tile contained of flame retardant and produced respectively from Example 1 to Example 5 displays better properties excellent in low-smokiness and flame retardancy.

And, each said polyester-based plastic floor tile due to having contained of flame retardant, if come into contact with a fire source, has ability to undergo spontaneous extinction or slow down the burning thereof and further cause the plastic floor tile itself to give off a pale white smoke only.

Therefore, each polyester-based plastic floor tile produced respectively from Example 1 to Example 5 poses a guarantee to user for safety, if come into contact with a fire.

As compared with the PVC-based non-flammable floor tile produced from either Comparative Example 1 or Comparative Example 3, although the said PVC-based non-flammable floor tile is capable of spontaneous extinction, if come into contact with a fire source, it inevitably give off a much denser black smoke to hinder a safe escape and thus poses a threat to user for safety.

4. As compared with the results shown in Table 2, the polyester-based plastic floor tile produced from either Example 1 or Example 2 contained of a modified polymer selected from either TPU or EPDM gains those advantages, namely, including excellent in much better tensile strength and higher resistance to wear and tear as well as less in weight loss (in reduction of 10%-40%), of which are more excellent than in the same properties measured from either the modified polymer-free counterpart produced from Comparative Example 2 or the PVC-based plastic floor tile produced from Comparative Example 1.

5. As compared with the results shown in Table 2, the polyester-based plastic floor tile produced from one of Example 1, Example 2 and Example 3 is produced in the presence of a modified polymer and a processing aid and then gains those advantages, namely, including excellent in being more well-gelatinized and more unsusceptible to cracking as well as being more enhanced resistance to solvents and more avoided being swelled and eroded by any solvent, of which are more excellent than in the same properties measured from either the modified polymer-free counterpart produced from Comparative Example 2 or even the PVC-based plastic floor tile produced from Comparative Example 1.

6. The modified polymer contained in the polyester PET-based floor tile of Comparative Example 4 or Comparative Example 5 requires a usage amount of 30 PHR indicative of overuse. The modified polymer is also disadvantaged by a disproportional usage amount of an anti-oxidizing agent and thus fails to bring anti-oxidation into play.

As a result, its appearance of the polyester-based plastic floor tile produced from either Comparative Example 4 or Comparative Example 5 shall discolor greatly, and also display unsatisfactory resistance to wear and tear thereof.

7. As compared with Comparative Example 1 or Comparative Example 2 having an unsatisfactory bank fluidity for producing the bottom-layer plastic sheet, in Example 1, Example 2 or Example 3 is given fillers having different particle diameters with a high filler usage amount, but the fillers contained of two kinds of calcium carbonates having different particle diameters are selected in accordance with Horsfield model to blend each other tightly by introducing the packing curve which is so approximate to a theoretical densest packing curve of Horsfield model as shown in FIG. 1, resulted in that the modified polyester resin composition prepared in Example 1, Example 2 or Example 3 therefore has an optimize bank fluidity for producing polyester plastic sheet if produced through processing rollers.

Since the modified polyester resin composition prepared in Example 1, Example 2 or Example 3 is given a satisfactory processing fluidity, the produced polyester-based plastic floor tile thereof each exhibits satisfactory resistance to wear and tear and better tensile strength and also displays a glossy surface.

8. As compared with the results shown in either Table 2 or Table 4, from Example 1 to Example 5 each entails introducing an oxidizing agent proportionately to ensure that the produced polyester-based plastic floor tile thereof each manifests satisfactory discoloration of appearance to remain valuable.

As compared with the PVC-based non-flammable floor tile produced from either Comparative Example 1 or Comparative Example 3, each polyester-based plastic floor tile produced respectively from Example 1 to Example 5 poses excellent properties in much better tensile strength, much higher resistance to wear and tear, much less in weight loss (in reduction of 10%-40%) and much higher resistance to solvents to avoided being swelled and eroded than that of the PVC-based non-flammable floor tile produced from either Comparative Example 1 or Comparative Example 3.

9. The polyester-based plastic floor tile of the present invention surpasses PVC-based plastic floor tiles in physical properties and processability.

Consequently, it is advantageous for the polyester-based plastic floor tile of the present invention to substitute for conventional PVC-based plastic floor tiles.

TABLE 1

| | | | Example 1 Trilayer lamination floor tile Polyester | | | Example 2 Trilayer lamination floor tile Polyester | | | Example 3 Monolayer Polyester |
|---|---|---|---|---|---|---|---|---|---|
| | Category | Name | D1[2] | D2[3] | D3[4] | D1[2] | D2[3] | D3[4] | |
| Composition (PHR)[1] | Resin | PETG | — | — | — | 75.0 | — | 75.0 | 75 |
| | | PCT | — | — | — | — | 75.0 | — | — |
| | | PCTA | — | 75.0 | — | — | — | — | — |
| | | PCTG | 75.0 | — | 75.0 | — | — | — | — |
| | Modified polymer | TPU | 25.0 | 25.0 | 25.0 | — | — | — | 25 |
| | | EPDM | — | — | — | 25.0 | 25.0 | 25.0 | — |
| | PVC Resin | S70[5] | — | — | — | — | — | — | — |
| | Stabilizer | Calcium-zinc stearate | — | — | — | — | — | — | — |
| | Processing Aid | Sodium benzoate | 0.5 | 0.5 | — | 0.5 | 0.5 | — | 0.5 |
| | | Magnesium benzoate | — | — | 0.5 | — | — | 0.5 | — |
| | | Propionate | 0.1 | 0.1 | 0.1 | 0.1 | 0.1 | 0.1 | — |
| | | Phosphite | 0.4 | 0.4 | 0.4 | 0.4 | 0.4 | 0.4 | 0.4 |
| | Lubricant | $C_{28}$ to $C_{32}$ Fatty acid esters | 0.25 | 0.25 | 0.25 | 0.25 | 0.25 | 0.25 | 0.25 |
| | | Stearate | — | — | — | — | — | — | — |
| | Plasticizer | DPGDB[6] | 5.0 | — | 7.0 | 10.0 | — | 7.0 | 9.0 |
| | | DOP[7] | — | — | — | — | — | — | — |
| | Filler | Calcium carbonate (80 μm) | — | 14 | 70 | — | 14 | 210 | 490 |
| | | Calcium carbonate (18 μm) | — | 2 | 10 | — | 2 | 30 | 70 |
| | | Aluminum hydroxide (1 μm) | 0 | 1.4 | 7 | 0 | 1.4 | 21 | 49 |
| | Modifier grain | MA[8] | — | — | — | 0.1 | 0.1 | 0.1 | 0.1 |
| | | MB[9] | 0.1 | 0.1 | 0.1 | — | — | — | — |
| | | MC[10] | 0.1 | 0.1 | 0.1 | — | — | — | 0.1 |
| | | MD[11] | — | — | — | 0.1 | 0.1 | 0.1 | — |
| | | Zinc borate | — | 0.7 | 3.5 | — | 0.47 | 7 | 5 |
| Thickness | Thickness of substrate (mm) | | 0.3 | 0.08 | 1.7 | 0.7 | 0.08 | 2.3 | 3.08 |
| | Thickness of floor tile finished products (mm) | | | 2.0 | | | 3.0 | | 3.0 |

| | | | Comparative Example 1 Trilayer lamination floor tile PVC | | | Comparative Example 2 Trilayer lamination floor tile Polyester | | |
|---|---|---|---|---|---|---|---|---|
| | Category | Name | D1[2] | D2[3] | D3[4] | D1[2] | D2[3] | D3[4] |
| Composition (PHR)[1] | Resin | PETG | — | — | — | 100 | 100. | 100. |
| | | PCT | — | — | — | — | — | — |
| | | PCTA | — | — | — | — | — | — |
| | | PCTG | — | — | — | — | — | — |
| | Modified polymer | TPU | — | — | — | — | — | — |
| | | EPDM | — | — | — | — | — | — |
| | PVC Resin | S70[5] | 100 | 100 | 100 | — | — | — |
| | Stabilizer | Calcium-zinc stearate | 5.5 | 7.5 | 3.0 | — | — | — |
| | Processing Aid | Sodium benzoate | 1.4 | 5.0 | 2.0 | — | — | — |
| | | Magnesium benzoate | — | — | — | — | — | — |
| | | Propionate | — | — | — | — | — | — |
| | | Phosphite | — | — | — | — | — | — |
| | Lubricant | C28 to C32 Fatty acid esters | — | — | — | 0.25 | 0.25 | 0.25 |
| | | Stearate | 0.5 | 0.5 | 0.5 | — | — | — |
| | Plasticizer | DPGDB[6] | — | — | — | 12.0 | — | 9.0 |
| | | DOP[7] | 19.0 | 6.0 | 10.0 | — | — | — |
| | Filler | Calcium carbonate (80 μm) | — | 16 | 240 | — | — | — |
| | | Calcium carbonate (18 μm) | — | — | — | — | 16 | 240 |
| | | Aluminum hydroxide (1 μm) | — | 1.4 | 21 | — | 1.4 | 21 |

TABLE 1-continued

| | | | | | | | | |
|---|---|---|---|---|---|---|---|---|
| | Modifier grain | MA[8] | — | — | — | — | — | — |
| | | MB[9] | — | — | — | — | — | — |
| | | MC[10] | — | — | — | — | — | — |
| | | MD[11] | — | — | — | — | — | — |
| | | Zinc borate | 5 | 5 | 5 | 5 | 5 | 5 |
| Thickness | Thickness of substrate (mm) | | 0.7 | 0.08 | 2.3 | 0.7 | 0.08 | 2.3 |
| | Thickness of floor tile finished products (mm) | | | 3.0 | | | 3.0 | |

TABLE 2

| | | | Example | | | Comparative Example | |
|---|---|---|---|---|---|---|---|
| | | | 1 | 2 | 3 | 1 | 2 |
| | | | | | Trilayer lamination floor tile | | |
| | | Name | Polyester | Polyester | Polyester | PVC | Polyester |
| Physical property | Resistance to wear and tear | Load 250 g (1000 turns) | 0.0041 g | 0.0041 g | 0.0040 g | 0.0049 g | 0.0045 g |
| | | Load 1000 g (1000 turns) | 0.0370 g | 0.0370 g | 0.0368 g | 0.0445 g | 0.0390 g |
| | | Load 1000 g (9500 turns) | 0.0750 g | 0.0750 g | 0.0748 g | 0.1480 g | 0.0850 g |
| | Tensile strength | | 1601 psi | 1618 psi | 1699 psi | 1541 psi | 1593 psi |
| | Contain Chlorine (Cl) content | | No | No | No | Yes | No |
| | Contain heavy metal | | No | No | No | Yes | No |
| | Non-flammability | upon contact with fire source when leaving fire source | Give off pale white smoke undergo spontaneous extinction | | | Give off thick black smoke undergo spontaneous extinction | Give off pale white smoke |
| Resistance to solvents | Toluene | | good | excellent | good | very poor | poor |
| | Adhesive Cleaner | | good | excellent | good | poor | poor |
| Resistance to lit cigarettes | Resistance to lit cigarettes A | | level 2 | level 1 | level 2 | level 4 | level 3 |
| | Resistance to lit cigarettes B | | level 2 | level 1 | level 2 | level 4 | level 3 |
| Processing fluidity | | | excellent | excellent | excellent | poor | poor |

TABLE 3

| | | | Example | | | |
|---|---|---|---|---|---|---|
| | | | 4 | | 5 | |
| | | | Bilayer Polyester-based non-flammable floor tile | | | |
| | | | Polyester | | Polyester | |
| Category | | Name | D1[2] | D3[4] | D1[2] | D3[4] |
| Composition (PHR)[1] | Resin | PETG | — | 75.0 | 75.0 | 75.0 |
| | | PET | 75.0 | — | — | — |
| | Modified polymer | TPU | 12.5 | 25.0 | — | — |
| | | EPDM | 12.5 | — | 25.0 | 25.0 |
| | PVC Resin | S70[5] | — | — | — | — |
| | Stabilizer | Calcium-zinc stearate | — | — | — | — |
| | Processing Aid | Sodium benzoate | 0.5 | — | 0.5 | — |
| | | Magnesium benzoate | — | 0.5 | — | 0.5 |
| | | Propionate | 0.1 | 0.1 | 0.1 | 0.1 |
| | | Phosphite | 0.4 | 0.4 | 0.4 | 0.4 |
| | Lubricant | C$_{28}$ Fatty acid ester | 0.25 | 0.25 | 0.25 | 0.25 |
| | | Stearate | — | — | — | — |
| | Plasticizer | DPGDB[6] | 5.0 | 40 | 10.0 | 40 |
| | | DOP[7] | — | — | — | — |
| | Filler | Calcium carbonate (17 μm) | 14 | 70 | 14 | 210 |
| | | Calcium carbonate (3 μm) | 2 | 10 | 2 | 30 |
| | | Aluminum hydroxide (1 μm) | 1.4 | 7 | 1.4 | 21 |
| | Modifier grain | MA[8] | — | — | 0.1 | 0.1 |
| | | MB[9] | 0.1 | 0.1 | — | — |
| | | MC[10] | 0.1 | 0.1 | — | — |

TABLE 3-continued

| Thickness | | MD[11] | | | 0.1 | 0.1 |
|---|---|---|---|---|---|---|
| | | Zinc borate | 0.7 | 3.5 | 0.35 | 5.25 |
| | Thickness of substrate (mm) | | 0.3 | 1.7 | 0.7 | 2.3 |
| | Thickness of floor tile finished products (mm) | | 2.0 | | 3.0 | |

| | | | Comparative Example | | | | | |
|---|---|---|---|---|---|---|---|---|
| | | | 3 Bilayer Polyester-based non-flammable floor tile | | 4 Bilayer Polyester-based non-flammable floor tile | | 5 Bilayer Polyester-based floor tile | |
| | | | PVC | | Polyester | | Polyester | |
| | Category | Name | D1[2] | D3[4] | D1[2] | D3[4] | D1[2] | D3[4] |
| Composition (PHR)[1] | Resin | PETG | — | — | 70.0 | 70.0 | 60 | 50 |
| | | PET | — | — | — | — | — | — |
| | Modified polymer | TPU | — | — | 30.0 | 30.0 | 40 | 50 |
| | | EPDM | — | — | — | — | — | — |
| | PVC Resin | S70[5] | 100 | 100 | — | — | — | — |
| | Stabilizer | Calcium-zinc stearate | 2.5 | 2.5 | — | — | — | — |
| | Processing Aid | Sodium benzoate | — | — | 0.5 | 0.5 | 0.5 | 0.5 |
| | | Magnesium benzoate | — | — | — | — | — | — |
| | | Propionate | 0.1 | 0.1 | 0.1 | 0.1 | 0.2 | 0.2 |
| | | Phosphite | 0.4 | 0.4 | 0.6 | 0.6 | 0.4 | 0.4 |
| | Lubricant | $C_{28}$ Fatty acid ester | — | — | 0.25 | 0.25 | 0.25 | 0.25 |
| | | Stearate | 0.5 | 0.5 | — | — | — | — |
| | Plasticizer | DPGDB[6] | 40 | 40 | — | — | 40 | 20 |
| | | DOP[7] | — | — | 40 | 40 | — | 20 |
| | Filler | Calcium carbonate (17 μm) | 16 | 80 | 16 | 240 | — | — |
| | | Calcium carbonate (3 μm) | — | — | — | — | 16 | 240 |
| | | Aluminum hydroxide (1 μm) | 1.4 | 7 | 1.4 | 21 | — | 21 |
| | Modifier grain | MA[8] | — | — | 0.1 | 0.1 | — | — |
| | | MB[9] | — | — | — | — | — | — |
| | | MC[10] | — | — | 0.1 | 0.1 | — | — |
| | | MD[11] | — | — | — | — | — | — |
| | | Zinc borate | 0 | 5 | 0 | 5 | 0 | 5 |
| Thickness | Thickness of substrate (mm) | | 0.7 | 2.3 | 0.7 | 2.3 | 0.7 | 2.3 |
| | Thickness of floor tile finished products (mm) | | 3.0 | | 3.0 | | 3.0 | |

TABLE 4

| | | | Example | | Comparative Example | | |
|---|---|---|---|---|---|---|---|
| | | | 4 | 5 | 3 | 4 | 5 |
| | | | | | Bilayer lamination floor tile | | |
| | | Name | Polyester | Polyester | PVC | Polyester | Polyester |
| Physical property | Resistance to wear and tear | Load 250 g (1000 turns) | 0.0041 g | 0.0041 g | 0.0049 g | 0.0043 g | 0.0045 g |
| | | Load 1000 g (1000 turns) | 0.0370 g | 0.0370 g | 0.0445 g | 0.0390 g | 0.0410 g |
| | | Load 1000 g (9500 turns) | 0.0750 g | 0.0750 g | 0.1480 g | 0.1100 g | 0.1200 g |
| | Tensile strength | | 1621 psi | 1628 psi | 1455 psi | 1520 psi | 1480 psi |
| | Contain Chlorine (Cl) content | | No | No | Yes | No | No |
| | Contain heavy metal | | No | No | Yes | No | No |
| | Non-flammability | upon contact with fire source | Give off pale white smoke | Give off pale white smoke | Give off thick black smoke | Give off pale white smoke | Give off pale white smoke |
| | | when leaving fire source | undergo spontaneous extinction | undergo spontaneous extinction | | undergo spontaneous extinction | undergo spontaneous extinction |
| Resistance to solvents | Toluene | | good | excellent | very poor | good | very poor |
| | Adhesive Cleaner | | good | excellent | poor | good | poor |
| Resistance to lit cigarettes | Resistance to lit cigarettes A | | level 2 | level 1 | level 4 | level 2 | level 3 |
| | Resistance to lit cigarettes B | | level 2 | level 1 | level 4 | level 2 | level 3 |
| Processing fluidity | | | excellent | excellent | fair | fair | poor |

Remark:
1. Table 1 and Table 3 ingredient usage amount unit of PHR (parts by hundreds of resins);
2. D1 is a surface-layer plastic sheet of a bilayer or trilayer polyester-based plastic floor tile.
3. D2 is a middle-layer plastic sheet of a trilayer polyester-based plastic floor tile.
4. D3 is a bottom-layer plastic sheet of a bilayer or trilayer polyester-based plastic floor tile.
5. S70 stands for a PVC resin produced from Formosa Plastic Group, Taiwan.
6. DPGDB stands for dipropylene glycol dibenzoate;
7. DOP stands for dioctyl phthalate
8. MA stands for phenyltrimethoxysilane
9. MB stands for isopropyl titanate;
10. MC stands for dibenzoyl peroxide (BPO)
11. MD stands for dialkyl peroxide

What is claimed is:

1. A modified polyester resin composition for use in producing a halogen-free and heavy metal-free polyester-based plastic floor tile excellent in high resistance to wear and tear, better tensile strength and preferable resistance to both lit cigarette and solvents, consisting of the following compositions:
(a) resin of 100 PHR, including a PET polyester, a PCT polyester, a CHDM modified copolyester selected one or more from the group consisting of PCTA, PCTG and PETG, and a modified polymer selected one or more from the group consisting of polybutadiene, TPU, styrene-butadiene copolymer, ethylene-propylene elastomer, polyolefin, polyether-ester type elastomer, EPDM, MBS, SBS and SEBS;
wherein the modified polymer accounts for 3-25 wt % and the rest accounts for 97-75 wt %, based on the total weight of the resin;
(b) processing aid of 0.3-6.0 PHR; selected one or more from the group consisting of an aromatic carboxylate, a propionate and a phosphate;
(c) lubricant of 0.1-5.0 PHR; selected one or more from the group consisting of $C_{28}$-$C_{32}$ fatty acid fatty acid, $C_{28}$-$C_{32}$ fatty acid fatty acid esters, $C_{28}$-$C_{32}$ fatty acid fatty alcohol and paraffin oil;
(d) plasticizer of 0.1-50 PHR; selected one or more from the group consisting of phosphate ester-based plasticizer, tribenzoate-based plasticizer, dibenzoate ester-based plasticizer, polyester-based plasticizer and aliphatic acetate ester-based plasticizer;
(e) filler of 0-600 PHR; having a particle diameter of 0.01-100 nm and selected one or more from talcum powder, calcium carbonate, magnesium hydroxide, aluminum hydroxide, mica powder, limestone and silica flour;
(f) modifier grain of 0.02-33 PHR; produced from a silane coupling agent or a titanate coupling agent cooperated with an initiator and/or a flame retardant;
wherein the initiator is a peroxide initiator, an azo-compound initiator or a redox-system initiator, either used solely or in combination, and the flame retardant is a phosphorus-containing a flame retardant, a nitrogen-containing flame retardant, a metallic hydroxide flame retardant or a halogen-free flame retardant, either used solely or in combination; and
(g) dye of 0-10 PHR.

2. The modified polyester resin composition as claimed in claim 1, wherein the aromatic carboxylate is one or more selected from the group consisting of potassium benzoate, sodium benzoate and magnesium benzoate.

3. The modified polyester resin composition as claimed in claim 1, wherein the propionate is a pentaerythrite tetra [β-(3,5-di-tert-butyl-4-hydroxyphenyl)-propionate], and the phosphite is a tri-(2,4-dimethyl-ethylbenzene) phosphite.

4. The modified polyester resin composition as claimed in claim 1, wherein the processing aid comprises a mixture of the propionate mixed with the phosphate by weight ratio of the propionate to the phosphite equal to 0.2:1-0.4:1.

5. The modified polyester resin composition as claimed in claim 1, wherein the plasticizer is a bis-ethyleneglycolate dibenzoate or a dipropylene glycol dibenzoate.

6. The modified polyester resin composition as claimed in claim 1, wherein the silane coupling agent is one or more selected from the group consisting of dimethoxysilane, trimethoxysilane, triethoxysilane, phenyltrimethoxysilane, vinyltrimethoxysilane, vinyltriethoxysilane and dimethyl-dimethoxysilane.

7. The modified polyester resin composition as claimed in claim 1, wherein the titanate coupling agent is an isopropyl titanate, a tetra-isopropyl titanate or a tetraoctyl titanate, by either used solely or in combination.

8. The modified polyester resin composition as claimed in claim 1, wherein the peroxide initiator is one or more selected from the group consisting of dibenzoyl peroxide (BPO), bis(2,4-dichlorobenzoyl)peroxide (DCBP), tert-butyl peroxypivalate (BPP), dicyclohexyl peroxydicarbonate (DCPD), potassium persulfate (KSP) and ammonium persulfate (ASP).

9. The modified polyester resin composition as claimed in claim 1, wherein the azo-compound initiator is selected from a 2,2'-azo-bis-isobutyronitrile (AIBN) or an azobisisoheptonitrile (ABVN), either used solely or in combination.

10. The modified polyester resin composition as claimed in claim 1, wherein an oxidant for the redox-system initiator is a hydroperoxide, a hydrogen peroxide, a persulfate, a dioyl peroxide or a dialkyl peroxide.

11. The modified polyester resin composition as claimed in claim 1, wherein a reducing agent of the redox system initiator is an oxalic acid, a glucose, a tertiary amine, a naphthenate, a thiol or an organic metallic compound, by either used solely or in combination.

12. The modified polyester resin composition as claimed in claim 1, wherein the phosphorus-containing flame retardant is a phosphate ester-containing flame retardant, an ammonium phosphate-containing flame retardant or an aromatic phosphate compound.

13. The modified polyester resin composition as claimed in claim 1, wherein the metallic hydroxide flame retardant is a magnesium hydroxide or an aluminum hydroxide.

14. The modified polyester resin composition as claimed in claim 1, wherein the halogen-free flame retardant is a zinc borate.

15. The modified polyester resin composition as claimed in claim 1, wherein the halogen-free flame retardant is a zinc borate.

16. The modified polyester resin composition as claimed in claim 1, wherein the modifier grain comprising a mixture of an aluminum hydroxide mixed with a zinc borate by weight ratio of the aluminum hydroxide to the zinc borate equal to 2:1-4:1.

17. A process for producing a halogen-free and heavy metal-free polyester-based plastic floor tile having a total thickness of 0.6-5.0 mm, comprising the steps of:
(1) uniformly mixing a modified polyester resin composition of claim 1 as a mixture through a mixer device and then introducing the mixture into a Banbury mixer, a kneader, a single-screw extruder or a twin-screw extruder for refinement, and subsequently into a roller machine for well-gelatinization;

(2) processing fully well-gelatinized mixture of step (1) with an extruder or a calendaring machine to produce either a molten surface-layer plastic sheet or a molten middle-layer plastic sheet of 0.08-0.7 mm in thickness, or, alternatively, a molten bottom-layer plastic sheet of 0.3-3.0 mm in thickness, or a molten monolayer floor tile having a total thickness of 0.3-3.0 mm;

(3) after cooling and shaping those molten surface-layer plastic sheet, molten middle-layer plastic sheet, molten bottom-layer plastic sheet or molten monolayer floor tiles, a predetermined size in thickness of a surface-layer plastic sheet, a middle-layer plastic sheet, a bottom-layer plastic sheet or a preform of monolayer floor tiles is produced, respectively; and (4) stacking one or more layers of the surface-layer plastic sheet and/or the middle-layer plastic sheet of step (3) together with one or more layer of the bottom-layer plastic sheet of step (3) to form a bilayer, trilayer or multilayer laminated preform structure; and (5) processing the bilayer, trilayer or multilayer laminated preform structure of step (4) or processing the preform of monolayer floor tile of step (3) with a hot press molding machine or a lamination apparatus respectively to form a laminated polyester-based plastic floor tile having a total thickness of 0.6-5.0 mm.

* * * * *